July 10, 1923.
A. M. REINER
WINDSHIELD
Filed May 7, 1921
1,461,095
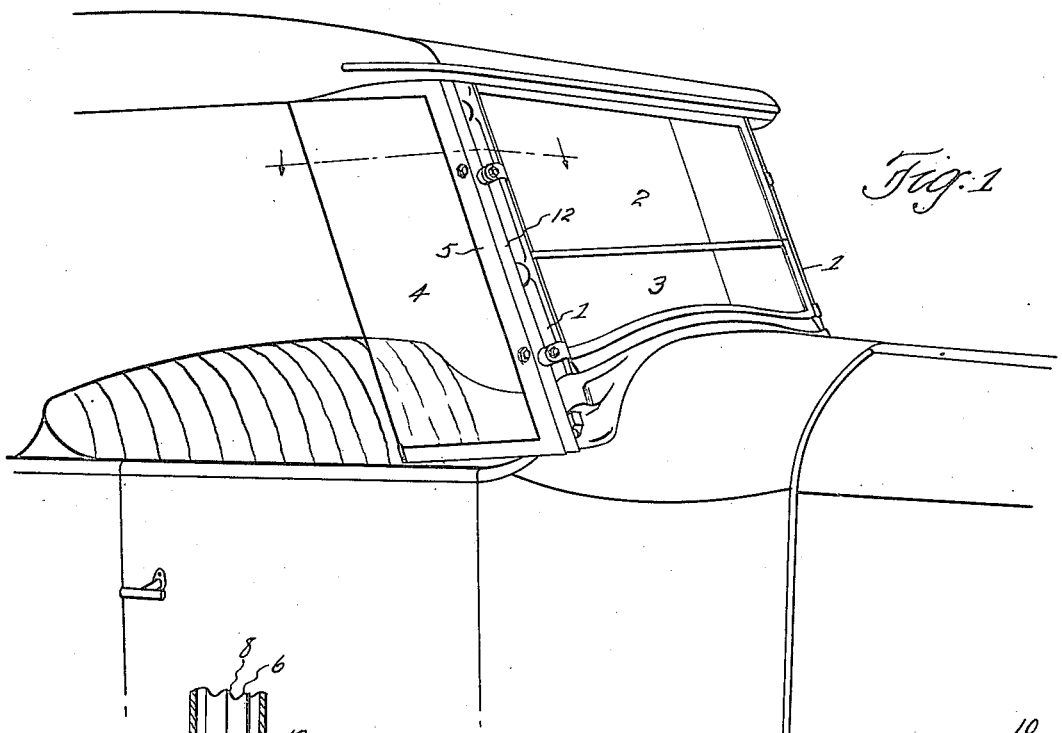
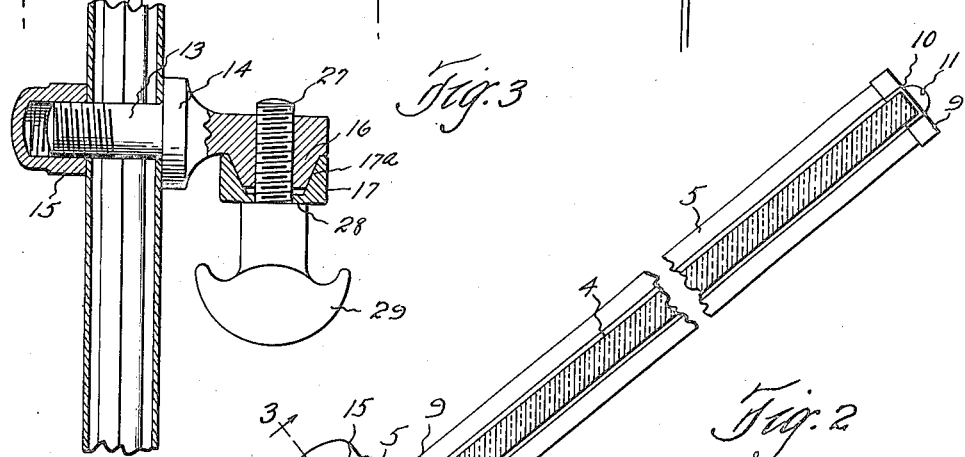
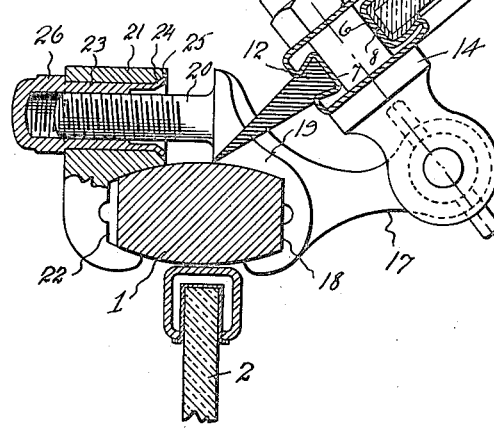
Inventor
A. Moritz Reiner
By Hull, Brock & West
Attys.

Patented July 10, 1923.

1,461,095

UNITED STATES PATENT OFFICE.

ABRAM MORITZ REINER, OF CLEVELAND, OHIO.

WINDSHIELD.

Application filed May 7, 1921. Serial No. 467,719.

*To all whom it may concern:*

Be it known that I, ABRAM MORITZ REINER, a citizen of the United States, residing at Cleveland, in the county of Cuyahoga and State of Ohio, have invented a certain new and useful Improvement in Windshields, of which the following is a full, clear, and exact description, reference being had to the accompanying drawings.

This invention relates to windshields for automobiles and more particularly to the side wings or extensions which are employed for the purpose of deflecting the air outwardly and away from the occupants of the front seat without materially obstructing their view.

It is the general object of this invention to improve the construction of such wings or extensions and their efficiency of operation, particularly as to the manner of mounting the transparent panes thereof and of adjustably supporting the wings upon the windshield standards. I accomplish the foregoing general objects, and other and more limited objects which will appear hereinafter, in and through the construction and arrangement of parts shown in the drawings forming part hereof, wherein Fig. 1 represents a perspective view of the front of an automobile, showing the manner of applying my invention thereto; Fig. 2 a sectional view corresponding substantially to the line 2—2 of Fig. 1, one of the clamping members being broken away; and Fig. 3 a sectional detail corresponding to the line 3—3 of Fig. 2.

Describing the various parts herein by reference characters, 1 denotes each of a pair of conventional windshield standards, pivotally supporting the upper and lower windshield sections 2 and 3. Cooperating with and adjustably and detachably secured to each of the standards is a wing or extension. Each wing or extension comprises generally a pane of heavy plate glass 4 mounted in a frame (indicated generally at 5) and embracing the top, bottom, and front edge of its pane, the frame being preferably continuous. The frame, as stated, is preferably continuous and made of a single strip of sheet metal bent to provide opposed rear and front dovetailed channels 6 and 7. The side edges of the strip are preferably brought into contact at about the middle of the rear channel 6 and are there united, as by electric welding, as indicated at 8. The channel 6 extends entirely around the inner edge of the frame 5, forming a seat for the top, bottom and inner edges of the plate glass pane 4. For the purpose of protecting the pane against breakage by jars, vibrations and shocks, a packing strip 9, preferably of felt, is applied to the channel 6 and between the edge of the pane 4 and the metal of said channel. Each pane is secured in its channeled seat within the frame by means of a pair of clamps, each having a widened channel portion adapted to embrace the rear edge of the upper and the lower portion of the frame 5 respectively, (covering the channel 6) and a narrow channel portion 10 extending beyond the cooperating portion of the frame 5 and engaging the pane 4. Each of the aforesaid clamps, 9, 10 is fastened to the rear end of its frame member by means of a screw 11.

Mounted in that part of the channel 7 which is provided in the front portion of the frame 5 is a strip 12 of flexible material, preferably rubber. This strip is adapted to extend across the gap between the front edge of the wing and the side and rear of the standard 1, when the parts are in the positions shown in Fig. 2 (as well as when the wing is swung outwardly at a greater angle than indicated with respect to the standard) whereby the passage of air between the standard and the wing is prevented, thus protecting the occupants of the front seat from drafts of air which would otherwise enter between the said standard and the frame 5.

For the purpose of adjustably mounting the wings upon the standards, the following construction is provided: A bolt 13 having a head 14 extends through the front part of the frame 5, between the channels 7 and 8. This head is adapted to bear against one side of the frame, the opposite end of the bolt being provided with a capped nut 15. Extending from the head 14, is a tapered seating projection 16, which cooperates with a tapered recessed seat 17$^a$ in a seating projection 17 on one of the members of a clamp which is adjustably secured to the standard 1. In addition to the seating projection 17, the clamping member referred to is provided with a channel 18, adapted to receive therewithin the rear edge of the standard 1, and with an outwardly extending projection 19 carrying, or having formed therewith, a bolt 20. This bolt extends through a bore 21 in the other clamping member, the said other clamping member also having a channel 22 cooperating with the channel 18 of the first-mentioned member. To connect the two clamping members in a particularly efficient manner, a capped nut is mounted in the bore 21, the said nut having an intermediate sleeve portion 23 provided with an internal thread adapted to mesh with the thread on the bolt 20 and having its rear end flared outwardly, as indicated at 24, to cooperate with the correspondingly flared seat 25 in the bore 21. The front end of the nut is indicated at 26 and constitutes a wrench-receiving portion as well as a shouldered bearing upon the surface surrounding the bore 21. By inserting the end of the bolt 20 into the hollow capped nut until the threads engage, and then, by rotating the said nut, the bolt 20 and the clamping member of which it is a part will be drawn toward the other clamping member and the parts may be firmly secured to the standard 1.

The front edge of the flexible strip 12 will be cut away to conform to and receive therewithin the forwardly projecting portions of the clamping brackets and, when desired, the said strips will effectively prevent the passage of air between the inner and front edge of each wing and the rear and outer edge of its bracket, by moving the wing outwardly a sufficient distance. To permit this movement, and to secure the wing in adjusted angular relation with respect to its standard, bolts 27 are provided, each of which extends through the seating projection 17 and is threaded into the co-operating projection 16 of the bolt 13, said bolt having a shoulder 28, bearing against the projection 17, and an operating handle 29.

Among the advantages secured by my construction are the following:

(a) Secure and efficient mounting of the pane 4 within the frame 5. Liability of breakage is reduced by the packing 9; and, if the pane should be cracked, the fragments are not liable to fall out, as the top, bottom, and front edges of the pane are securely clamped.

(b) The wings may be applied to varying types of existing standards by reason of the flexibility secured in and through the construction of the clamping members.

(c) The frame is pivotally supported from the standards by a construction in which the glass is not perforated, the means for mounting the wing extending through the supporting frame therefor out of contact with the glass.

(d) The wings may be used for the purpose of protecting the occupants of the front seat from dust, rain, etc., and without the passage of drafts between the front and inner edges of the same and the windshield brackets.

(e) The constructions by which the above results are secured are simple, durable and efficient.

Having thus described my invention, what I claim is:

1. The combination, with a standard, of a support adjustably connected thereto, a wing comprising a frame having channels in the front and rear edges thereof, a pane of transparent material mounted in the rear channel, a strip of flexible material mounted in the front channel and adapted to extend across and close the space between the said frame and the said standard, and means for pivotally supporting the said wing from the said support, the said supporting means comprising one or more bolts extending through the said frame between the channels thereof.

2. The combination, with a windshield standard, of a clamping and supporting member adjustably connected thereto and having a projection provided with a tapered seating member, a windshield wing comprising a U-shaped frame having a transparent pane mounted therein, a supporting member extending through said frame and having a tapered seating member adapted to cooperate with the other member, means cooperating with such seating members for clamping the said wing to the first mentioned member, and a sealing strip carried by said frame and adapted to contact with said standard to close the space between said frame and said standard.

3. The combination, with a windshield standard, of a wing comprising a frame having a pane mounted therein, a pair of bolts spaced apart and extending through the front of said frame and secured thereto and out of contact with the said pane, a pair of clamping members spaced apart and adjustably connected to the said standard, a pivotal connection between the said bolts and their respective clamping members, and means carried by said frame and contacting with said standard for sealing the space between said frame and standard.

In testimony whereof, I hereunto affix my signature.

A. MORITZ REINER.